(12) United States Patent
Din et al.

(10) Patent No.: US 9,849,662 B2
(45) Date of Patent: Dec. 26, 2017

(54) LEAD SCREW GUIDE ASSEMBLY AND THREE-DIMENSIONAL PRINTING APPARATUS

(71) Applicants: XYZprinting, Inc., New Taipei (TW); Kinpo Electronics, Inc., New Taipei (TW); Cal-Comp Electronics & Communications Company Limited, New Taipei (TW)

(72) Inventors: Shih-Jer Din, New Taipei (TW); Jui-Feng Chang, New Taipei (TW)

(73) Assignees: XYZprinting, Inc., New Taipei (TW); Kinpo Electronics, Inc., New Taipei (TW); Cal-Comp Electronics & Communications Company Limited, New Taipei (TW)

( * ) Notice: Subject to any disclaimer, the term of this patent is extended or adjusted under 35 U.S.C. 154(b) by 223 days.

(21) Appl. No.: 14/599,536

(22) Filed: Jan. 18, 2015

(65) Prior Publication Data
US 2016/0159008 A1 Jun. 9, 2016

(30) Foreign Application Priority Data
Dec. 4, 2014 (CN) .......................... 2014 1 0729405

(51) Int. Cl.
*B33Y 30/00* (2015.01)
*B29C 64/20* (2017.01)

(52) U.S. Cl.
CPC .............. *B33Y 30/00* (2014.12); *B29C 64/20* (2017.08)

(58) Field of Classification Search
CPC . B29C 67/0085; B29C 67/0062; B29C 31/04; B29C 31/042; B29C 47/1018;
(Continued)

(56) References Cited

U.S. PATENT DOCUMENTS 5,290,503 A * 3/1994 Katayama .......... B29D 30/0603
264/315
5,902,611 A * 5/1999 Stegmaier ........... B29C 45/5008
425/145
(Continued)

FOREIGN PATENT DOCUMENTS

TW I433747 4/2014

OTHER PUBLICATIONS

"Office Action of China Counterpart Application," dated Aug. 8, 2017, p. 1-p. 8.

*Primary Examiner* — Matthew J Daniels
*Assistant Examiner* — Leith S Shafi
(74) *Attorney, Agent, or Firm* — JCIPRNET

(57) ABSTRACT

The invention provides a lead screw guide assembly and a three-dimensional (3D) printing apparatus, wherein the lead screw guide assembly includes a base, a first guiding member, a second guiding member and a lead screw guide. The first guiding member is disposed on the base and has a first channel extending along an axis. The second guiding member is movably coupled to the first guiding member along the axis. The lead screw guide is movably disposed on the base along the axis and located in the first channel. The lead screw guide is coupled to the second guiding member, so as to drive the second guiding member to move along the axis and hide in the first channel or protrude from the first channel.

19 Claims, 4 Drawing Sheets

(58) Field of Classification Search
CPC . B29C 67/0074; B33Y 30/00; B29L 2009/00;
A23G 1/20; A23G 1/201; A23G 1/202;
A23G 1/203; A23G 1/205; A23G 1/206;
A23G 3/0021; A23G 3/068; A23G
3/0242; A23G 3/2015
USPC .................................. 425/135, 145–150, 66
See application file for complete search history.

(56) References Cited

U.S. PATENT DOCUMENTS

| | | | |
|---|---|---|---|
| 6,572,362 B2* | 6/2003 | Boyd ...................... | B29C 45/20 |
| | | | 264/328.11 |
| 7,114,940 B2* | 10/2006 | Ickinger .............. | B29C 45/5008 |
| | | | 425/145 |
| 7,798,798 B2* | 9/2010 | Boyd ...................... | B29C 45/06 |
| | | | 425/126.1 |
| 7,819,655 B2* | 10/2010 | Schulz ................ | B29C 45/5008 |
| | | | 425/149 |
| 2003/0026866 A1 | 2/2003 | Boyd | |
| 2008/0174048 A1 | 7/2008 | Boyd et al. | |
| 2009/0297655 A1 | 12/2009 | Schulz | |
| 2012/0251689 A1* | 10/2012 | Batchelder ........... | A23G 1/0056 |
| | | | 426/383 |

\* cited by examiner

LEAD SCREW GUIDE ASSEMBLY AND THREE-DIMENSIONAL PRINTING APPARATUS

CROSS-REFERENCE TO RELATED APPLICATION

This application claims the priority benefit of China application serial no. 201410729405.9, filed on Dec. 4, 2014. The entirety of the above-mentioned patent application is hereby incorporated by reference herein and made a part of this specification.

BACKGROUND

Technical Field

The invention relates to a lead screw guide assembly and a printing apparatus, and more particularly to a lead screw guide assembly and a three-dimensional (3D) printing apparatus.

Description of Related Art

As the technology advanced in recent years, many methods that utilize additive manufacturing technology (e.g. layer-by-layer model construction) to build three-dimensional (3D) physical models have been proposed. Typically, the additive manufacturing technology is to convert data of a 3D model, which is constructed by software, such as computer aided design (CAD), into multiple thin (quasi-two-dimensional) cross-sectional layers that are stacked in sequence. In the meantime, many technical means for forming thin cross-sectional layers are also proposed. For example, a printing unit of a printing apparatus is usually configured to move above a printing stand along an XY plane according to spatial coordinates XYZ constructed according to the design data of the 3D model, so as to use a construction material to form shapes of the cross-sectional shapes correctly. Then, by driving the printing unit to move along the Z-axis layer-by-layer, multiple cross-sectional layers can be gradually stacked and cured layer-by-layer; finally, a 3D object is formed.

A 3D printing apparatus is usually provided with a lead screw guide assembly. Through the movement of the lead screw guide, the constructing material in the printing unit is squeezed on the printing stand. To allow sufficient moving path for the lead screw guide, the housing of the 3D printing apparatus is provided with an operating space reserved for the lead screw guide to move therein, which in return causes the housing to be too large. In other words, to adapt to the actuation of the lead screw guide, the housing has to remain in the size that allows the lead screw guide to actuate even when the lead screw guide does not actuate. In that case, a part space of the housing is actually not in use when the lead screw assembly does not actuate. As the housing of the 3D printing apparatus has to be kept in a large size, which makes it difficult to transport or move the 3D printing apparatus.

SUMMARY OF THE INVENTION

The invention is directed to a lead screw guide assembly and a 3D printing apparatus adapted to reduce the space required for the 3D printing apparatus.

In the invention, the lead screw guide assembly is adaptable for a 3D printing apparatus. The lead screw guide assembly includes a base, a first guiding member, a second guiding member and a lead screw guide. The first guiding member is disposed on the base and has a first channel extending along an axis. The second guiding member is movably coupled to the first guiding member along the axis. The lead screw guide is movably disposed on the base along the axis and located in the first channel. The lead screw guide is coupled to the second guiding member, so as to drive the second guiding member to move along the axis and hide in the first channel or protrude from the first channel.

In the invention, the 3D printing apparatus includes a printing stand, a lead screw guide assembly and a printing unit. The lead screw guide assembly is movably disposed above the printing stand, including a base, a first guiding member, a second guiding member and a lead screw guide. The first guiding member is disposed on the base and has a first channel extending along an axis. The second guiding member is movably coupled to the first guiding member along the axis. The lead screw guide is movably disposed on the base along the axis and located in the first channel. The lead screw guide is coupled to the second guiding member, so as to drive the second guiding member to move along the axis and hide in the first channel or protrude from the first channel. The printing unit is connected to the lead screw guide assembly and corresponds to the lead screw guide.

In an embodiment of the invention, the second guiding member has a second channel extending along the axis and connected to the first channel, and the lead screw guide is located in the first channel and the second channel.

In an embodiment of the invention, the second guiding member further includes a pair of first guiding tracks extending along the axis and located at two opposite sides of the second channel. Two opposite sides of the first guiding member have a pair of first guiding posts facing the second guiding member. The pair of first guiding posts is correspondingly embedded in the pair of first guiding tracks, so that the second guiding member is coupled to the first guiding member and moves relative to the first guiding member along the axis via the pair of first guiding tracks.

In an embodiment of the invention, the second guiding member further includes a pair of second guiding tracks extending along the axis and located at two opposite sides of the second channel. The lead screw guide has a pair of second guiding posts correspondingly embedded in the pair of second guiding tracks, so that the lead screw guide is coupled to the second guiding member and moves relative to the base along the axis via the pair of second guiding tracks.

In an embodiment of the invention, the second guiding member includes two plates opposite to each other and spaced apart by a distance to construct the second channel.

In an embodiment of the invention, the first guiding member includes two plates opposite to each other and spaced apart by a distance to construct the first channel.

In an embodiment of the invention, the base includes a supporting plate and a linear motor. The linear motor is disposed on the supporting plate and connected to the lead screw guide, so as to drive the lead screw guide to move relative to the base.

In an embodiment of the invention, the lead screw guide has a pressing end and a guiding end opposite to each other. The pressing end is located at one side of the base relative to the second guiding member, and the guiding end is coupled to the second guiding member. When the lead screw guide moves along the axis and causes the pressing end to move away from the base, the lead screw guide drives the second guiding member via the guiding end to move along the axis and hide in the first channel. When the lead screw guide moves along the axis and causes the pressing end to move closer to the base, the lead screw guide drives the second guiding member via the guiding end to move along the axis and protrude from the first channel.

In an embodiment of the invention, a barrel is disposed at one side of the lead screw guide, and the lead screw guide corresponds to the barrel via the pressing end.

In an embodiment of the invention, the lead screw guide assembly further includes a detecting unit disposed at one side of the first guiding member and adjacent to the second guiding member, so as to detect a position of the lead screw guide.

As indicated above, in the lead screw guide assembly and the 3D printing apparatus of the invention, the lead screw guide is movably disposed on the base and coupled to the second guiding member. The second guiding member is movably coupled to the first guiding member and adaptable for moving relative to the first guiding member. In that case, when the 3D printing apparatus is in the operating state, the lead screw guide that is coupled to the second guiding member may move relative to the base and drive the second guiding member to move and hide in the first channel or protrude from the first channel. Accordingly, when the 3D printing apparatus is in the transporting state in which the lead screw guide assembly does not actuate, the overall height of the lead screw guide assembly can be reduced. Therefore, the housing adopted by the 3D printing apparatus does not need to have an additional operating space reserved for the lead screw guide assembly. Thus, the lead screw guide assembly and the 3D printing apparatus of the invention can reduce the space required for the 3D printing apparatus.

In order to make the aforementioned features and advantages of the invention more comprehensible, embodiments accompanying figures are described in detail below.

DESCRIPTION OF EMBODIMENTS

Figure 1:
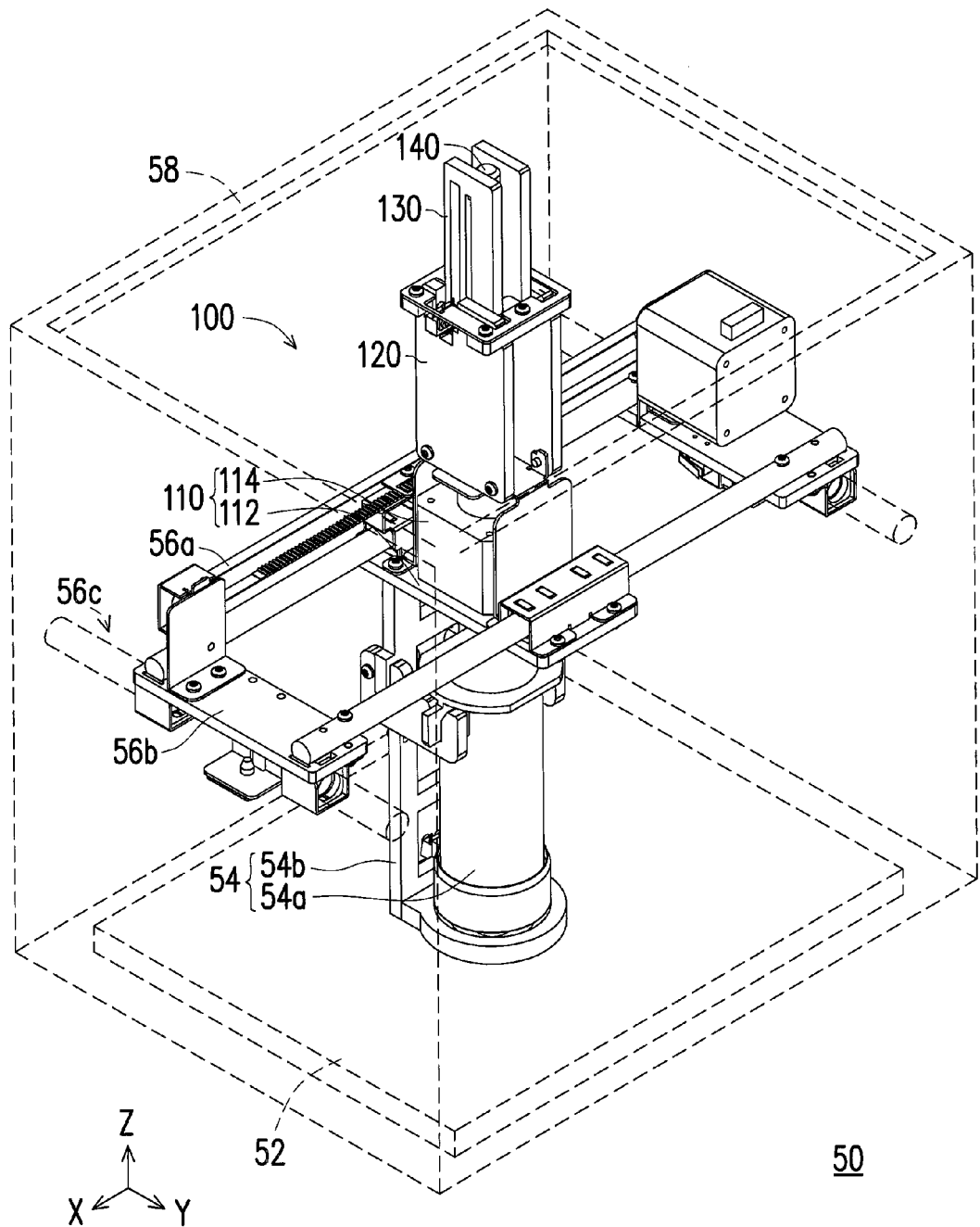
FIG. 1 is a schematic view illustrating a 3D printing apparatus according to an embodiment of the invention.

FIG. 1 is a schematic view illustrating a 3D printing apparatus according to an embodiment of the invention. Please refer to FIG. 1. In the embodiment, a 3D printing apparatus 50 includes a printing stand 52, a printing unit 54, and a lead screw guide assembly 100. The printing stand 52 is used for placing a 3D object (not shown) formed by the 3D printing apparatus 50; that is, the 3D printing apparatus 50 performs printing on the printing stand 52. The lead screw guide assembly 100 is movably disposed above the printing stand 52. The printing unit 54 is movably disposed above the printing stand 52 and connected to the lead screw guide assembly 100. The printing unit 54 is, for example, disposed under the lead screw guide assembly 100 and between the lead screw guide assembly 100 and the printing stand 52. The printing unit 54 may move together with the lead screw guide assembly 100 relative the printing stand 52. In addition, the 3D printing apparatus 50 further includes a plurality of moving units 56a to 56c, which are, for example, a combination of a track and a driving motor, so as to drive the lead screw guide assembly 100 and the printing unit 54 to move relative to the printing stand 52. For instance, FIG. 1 shows that the lead screw guide assembly 100 is disposed on the moving unit 56a, and therefore the lead screw guide assembly 100 may move along an X-axis shown by FIG. 1 via the moving unit 56a. Likewise, the lead screw guide assembly 100 and the moving unit 56a may be further disposed on the moving units 56b and 56c to move along a Y-axis or Z-axis shown by FIG. 1 via the moving units 56b and 56c. In the manner, the printing unit 54 and the lead screw guide assembly 100 of the 3D printing apparatus 50 may adjust the printing position thereof in the space above the printing stand 52 depending on the needs and print out the 3D object.

Figure 2:
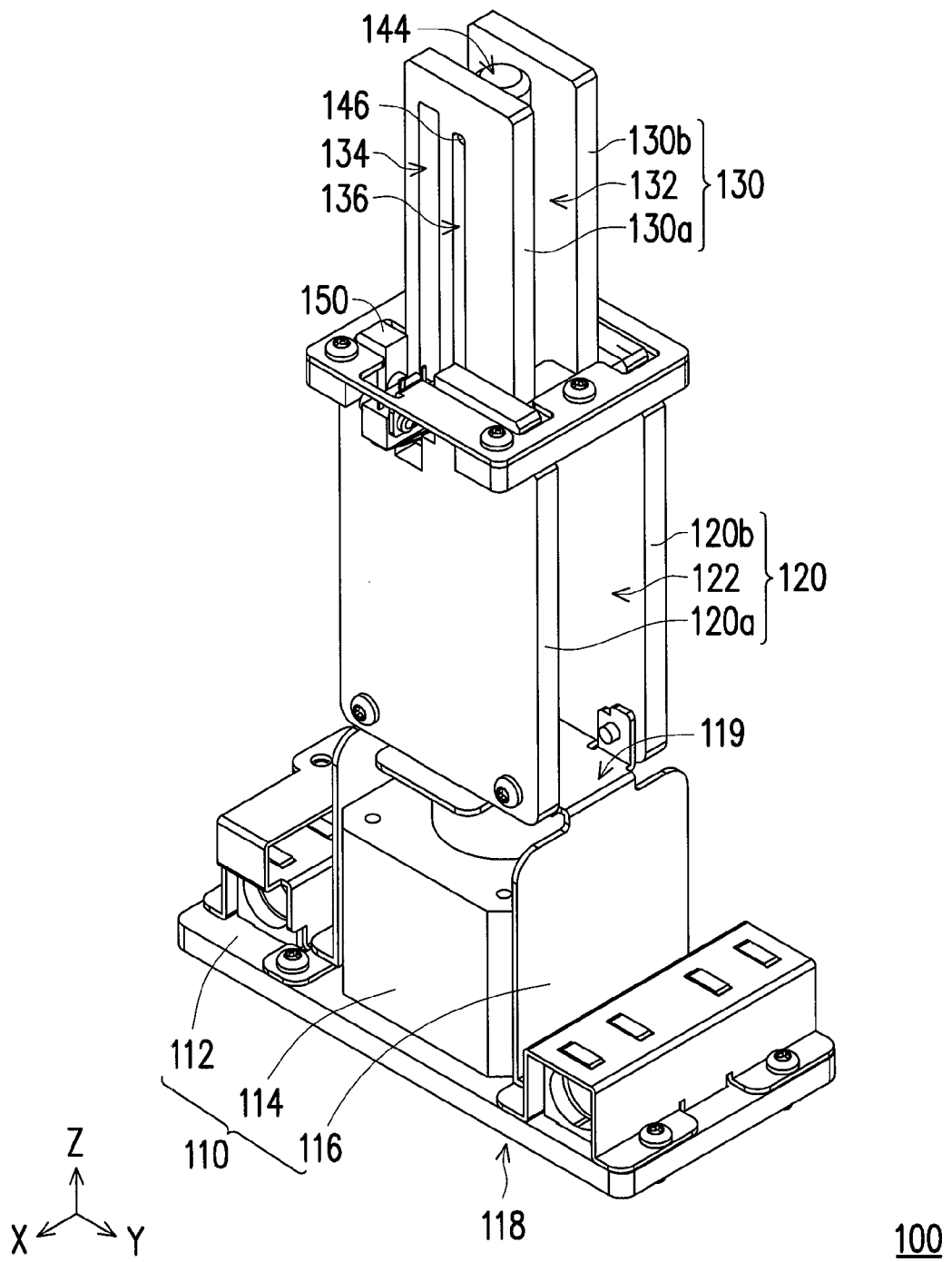
FIG. 2 is a perspective view illustrating a lead screw guide assembly of FIG. 1.
Figure 3:
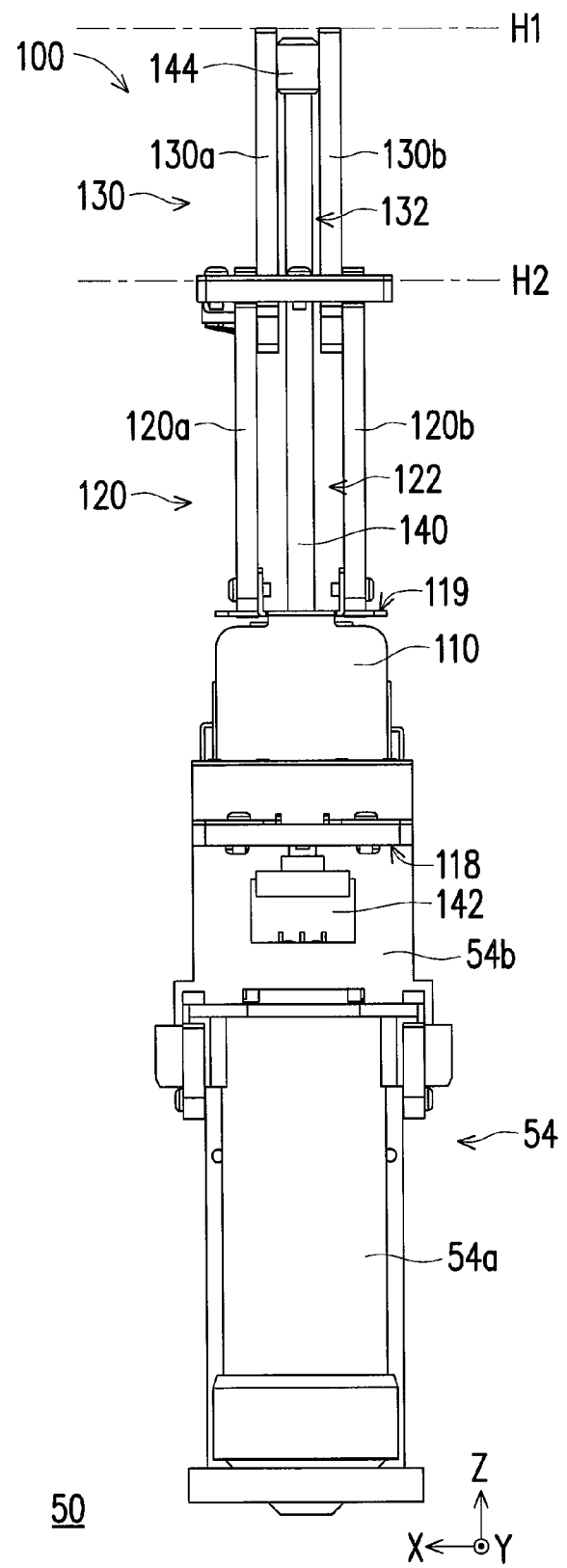
FIG. 3 is a side view illustrating the 3D printing apparatus of FIG. 1.

FIG. 2 is a perspective view illustrating a lead screw guide assembly of FIG. 1. FIG. 3 is a side view illustrating the 3D printing apparatus of FIG. 1. Please refer to FIGS. 1-3. In the embodiment, the lead screw guide assembly 100 includes a base 110, a first guiding member 120, a second guiding member 130 and a lead screw guide 140. The first guiding member 120 is disposed at one side of the base 110, for example, above the base 110, and has a first channel 122 extending along an axis (e.g. Z-axis shown by FIG. 2). The second guiding member 130 is movably coupled to the first guiding member 120 along the Z-axis, for example, coupled above the first guiding member 120, so that the first guiding member 120 is located between the base 110 and the second guiding member 130. The lead screw guide 140 is movably disposed on the base 110 along the Z-axis and located in the first channel 122. The lead screw guide 140 is coupled to the second guiding member 130. In the manner, the lead screw guide 140 may drive the second lead screw member 130 to move along the Z-axis and hide in the first channel 122 or protrude from the first channel 122.

In such manner, when the 3D printing apparatus 50 is in the transporting state in which the lead screw guide assembly 100 does not actuate, the overall height of the lead screw guide assembly 100 can be reduced. Specifically, the 3D printing apparatus further includes a housing 58 which, for example, consists of a plurality of assembling frames, wherein the above-mentioned components are disposed in the housing 58. When the 3D printing apparatus 50 is in the transporting state in which the lead screw guide assembly 100 does not actuate, the lead screw guide 140 and the second guiding member 130 of the lead screw guide assembly 100 may hide in the first channel 122. In other words, when the lead screw guide 140 and the second guiding member 130 of the lead screw guide assembly 100 hide in the first channel 122, the overall height of the 3D printing apparatus 50 is the distance between the printing stand 52 and the bottom of the first guiding member 120. When the 3D printing apparatus 50 is in the operating state, the second guiding member 130 and the lead screw guide 140 protruding from the first channel 122 may extend outward from an opening of the housing depending on the operation. In that case, the housing adopted by the 3D printing apparatus 50 does not need to have an additional operating space reserved for the lead screw guide assembly 100 when actuating, thereby reducing the space required for the 3D printing apparatus 50. In such manner, the lead screw guide assembly 100 and the 3D printing apparatus 50 of the invention can reduce the space required for the 3D printing apparatus 50.

Specifically, in the embodiment, the base 110 includes a supporting plate 112 and a linear motor 114. The supporting plate 112 is disposed on the moving unit 56 (shown by FIG. 1), so that the lead screw guide assembly 100 is disposed on the moving unit 56 and move via the moving unit 56. The linear motor 114 is disposed on the supporting plate 112 and connected to the lead screw guide 140, so as to drive the lead screw guide 140 to move relative to the base 110, wherein the linear motor 114 may be fixed on the supporting plate 112 via a fixing member 116. The linear motor 114 drives the lead screw guide 140 to move back and forth along a single axis. In the embodiment, for example, the lead screw guide 140 is driven to move back and forth along the Z-axis, however, which should not be construed as a limitation to the invention. Furthermore, the base 110 has a first position-limiting portion 118 and a second position-limiting portion 119. The first position-limiting portion 118 is disposed at the bottom of the base 110, so as to restrict the lead screw guide 140 to move relative to the base 110 until a pressing end 142 contacts the first position-limiting portion 118. The second position-limiting portion 119 is disposed at the top of the base 110, so as to restrict the lead screw guide 140 to move relative to the base 110 until a guiding end 144 contacts the second position-limiting portion 119. The first position-limiting portion 118 and the second position-limiting portion 119 may be formed of a partial region of the base 110. For instance, the periphery of an opening (not shown) on the supporting plate 112 of the base 110 which allows the lead screw guide 140 to pass through may serve as the first position-limiting portion 118. Meanwhile, the periphery of an opening (not shown) on the fixing member 116 for fixing the linear motor 114 which allows the lead screw guide 140 to pass through may serve as the second position-limiting portion 119; however, the above embodiments may not be construed as a limitation to the invention, which may be adjusted depending on the needs.

In addition, in the embodiment, the lead screw guide 140 has the pressing end 142 and the guiding end 144 opposite to each other. The pressing end 142 (shown by FIG. 3) is located at one side of the base 110 relative to the second guiding member 130, i.e. under the base, and the guiding end 144 is coupled to the second guiding member 130. In other words, the lead screw guide 140 passes through the base 110, so that the pressing end 142 and the guiding end 144 thereof are respectively located above and under the base. In such manner, the printing unit 54 disposed under the lead screw guide assembly 100 may correspond to the pressing end 142 of the lead screw guide 140 as shown by FIG. 3. The lead screw guide 140 may move relative to the base 110 in the first channel 122 along the Z-axis by being guided via the first guiding member 120 and the second guiding member 130. For example, when the lead screw guide 140 moves along the Z-axis and causes the pressing end 142 to move away from the base 110, the lead screw guide 140 drives the second guiding member 130 via the guiding end 144 to move along the Z-axis and hide in the first channel 122. When the lead screw guide 140 moves along the Z-axis and causes the pressing end 142 to move closer to the base 110, the lead screw guide 140 drives the second guiding member 130 via the guiding end 144 to move along the Z-axis and protrude from the first channel 122, causing the pressing end 142 to contact or move away from the printing unit 54.

On the other hand, in the embodiment, the first guiding member 120 includes two plates 120a and 120b fixed on the base 110. The two plates 120a and 120b are opposite to each other and spaced apart by a distance to construct the first channel 122, and the lead screw guide 140 may hide in the first channel 122. Likewise, the second guiding member 130 in the embodiment has a second channel 132 extending along the Z-axis and connected to the first channel 122. Meanwhile, the lead screw guide 140 is located in the first channel 122 and the second channel 132, wherein the second guiding member 130 may include two plates 130a and 130b movably coupled to the first guiding member 120. The two plates 130a and 130b are opposite to each other and spaced apart by a distance to construct the second channel 132. Specifically, the plate 130a is coupled to the plate 120a, and the plate 130b is coupled to the plate 120b, such that the first channel 122 and the second channel 132 are connected to each other. In such manner, the first guiding member 120 and the second guiding member 130 provide the first channel 122 and the second channel 132 as an accommodating space and moving path for the lead screw guide 140, so that the lead screw guide 140 may move relative to the base 110 in the first channel 122 and the second channel 132 along the Z-axis. In addition, the second guiding member 130 may move relative to the base 110 in the first channel 122 along the Z-axis.

Furthermore, in the embodiment, the second guiding member 130 further includes a pair of first guiding tracks 134 (FIG. 2 shows one of the first guiding tracks 134 as an example). The first guiding track 134 extends along the Z-axis and located at two opposite sides of the second channel 132, for example, respectively on the two plates 130a and 130b used as the second guiding member 130. Correspondingly, two opposite sides of the first guiding member 120 have a pair of first guiding posts (not shown) facing the second guiding member 130, located in inner sides of the two plates 120a and 120b used as the first guiding member 120, and corresponding to outer sides of the second guiding member 130. In such configuration, the pair of first guiding posts not shown is correspondingly embedded in the pair of first guiding tracks 134, so that the second guiding member 120 is movably coupled to the first guiding member 120 and moves relative to the first guiding member 120 along the Z-axis via the first guiding tracks 134, for example, to move into the first channel 122 relative to the first guiding member 120 along the Z-axis.

Likewise, the lead screw guide 140 in the embodiment may be movably coupled to the second guiding member 130 via the above means. Specifically, in the embodiment, the second guiding member 130 further includes a pair of second guiding tracks 136 (FIG. 2 shows one of the second guiding tracks 136 as an example) extending along the Z-axis and located at two opposite sides of the second channel 132, for example, respectively on the two plates 130a and 130b used as the second guiding member 130. Correspondingly, the lead screw guide 140 has a pair of second guiding posts 146 (FIG. 2 shows one of the second guiding tracks 146 as an example) located at two opposite sides of the guiding end 144. In such configuration, the pair of second guiding posts 146 is correspondingly embedded in the pair of second guiding tracks 136, so that the lead screw guide 140 is coupled to the second guiding member 130 via the guiding end 144 and moves relative to the base 110 along the Z-axis via the second guiding tracks 136.

In light of the above, in the embodiment, the first guiding member 120 is fixed on the base 110. The second guiding member 130 may move relative to the first guiding member 120 and the base 110 along the Z-axis via the embedding relation between the first guiding tracks 134 and the first guiding posts. The lead screw guide 140 may move relative to the second guiding member 130, the first guiding member 120 and the base 110 along the Z-axis via the embedding relation between the second guiding posts 146 and the second guiding tracks 136. When the lead screw guide 140 moves relative to the base 110, the guiding end 144 of the lead screw guide 140 moves along the Z-axis by being guided via the second guiding member 130 and the first guiding member 120. Besides, the pressing end 142 of the lead screw guide 140 moves away from or closer to the bottom of the base 110, so as to move correspondingly closer or away from the printing unit 54 under the lead screw guide assembly 100.

Figure 4:
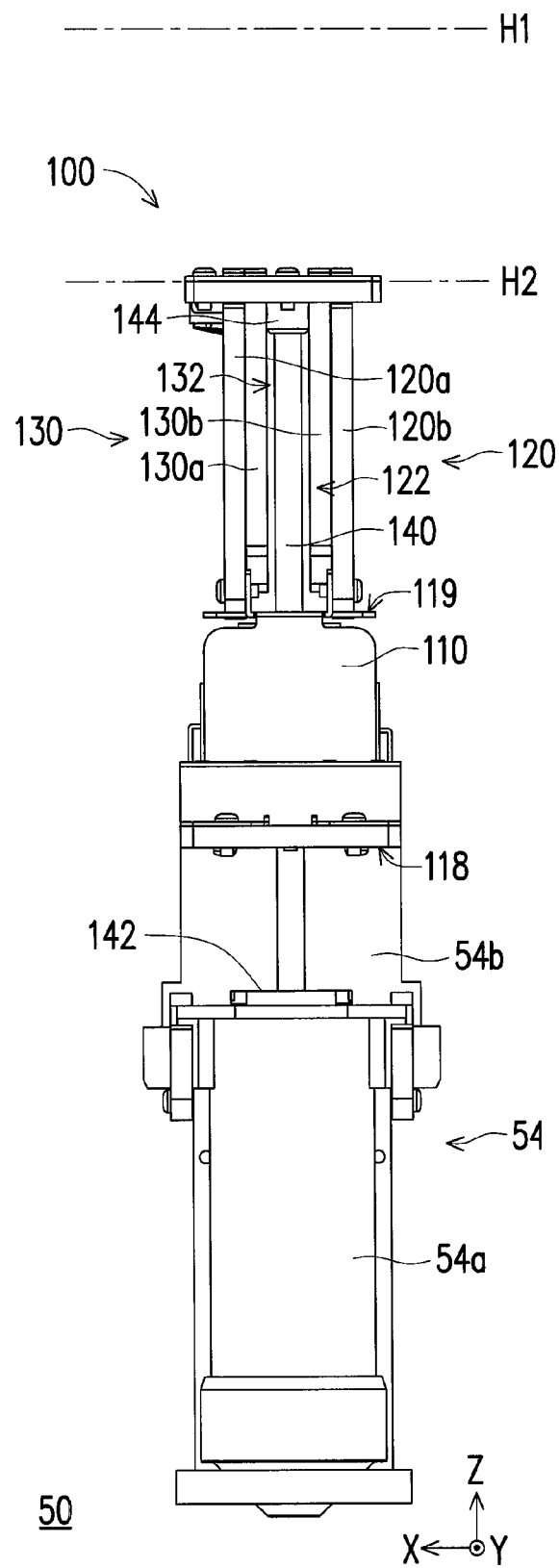
FIG. 4 is a side view illustrating the 3D printing apparatus of FIG. 3 in another operating state.

FIG. 4 is a side view illustrating the 3D printing apparatus of FIG. 3 in another operating state. Please refer to FIGS. 1-4. In the embodiment, the printing unit 54 includes a barrel 54a and a moving rack 54b holding the barrel 54a, which should not be construed as a limitation to the invention. In the meantime, the barrel 54a is loaded with a printing material which is not shown and disposed on the moving rack 54b. In addition, the lead screw guide 140 corresponds to the barrel 54a via the pressing end 142. The moving rack 54b is fixed on the base 110 of the lead screw guide assembly 100 and may drive the barrel 54a to move relative to the printing stand 52 (shown by FIG. 1) along with the lead screw guide assembly 100. In such manner, when the 3D printing apparatus 50 is in the initial state or during replacement of barrel 54a, the pressing end 142 of the lead screw guide 140 of the lead screw assembly 100 is located at the bottom of the base 110 away from the printing unit 54, allowing a suitable distance to be kept between the pressing end 142 and the moving rack 54b, such that the barrel 54a can be easily disposed on the moving rack 54b. At this time, the second guiding member 130 coupled to the guiding end 144 of the lead screw guide 140 expands upward relative to the first guiding member 120, so that the lead screw guide 140 is located in the first channel 122 and the second channel 132, and the guiding end 144 of the lead screw guide 140 and the top portion of the second guiding member 130 are located at a first level of height H1.

Thereafter, when the 3D printing apparatus 50 is in the operating state, the lead screw guide 140 of the lead screw guide assembly 100 is driven by the linear motor 114 (shown by FIG. 2) of the base 110 to move downward relative to the base 110 along the X-axis, causing the pressing end 142 to move away from the bottom of the base 110 and contact the printing unit 54 as shown by FIGS. 3-4. The 3D printing apparatus 50 is in the operating state; that is, the 3D printing apparatus 50 prints out the required 3D object via the printing unit 54. At this time, the lead screw guide 140 of the lead screw guide assembly 100 moves downward relative to the base 110 along the Z-axis, causing the pressing end 142 to contact the printing unit 54, as described above, and further extends into the barrel 54a (as shown by FIG. 4), causing the printing material in the barrel 54a to be squeezed out by the pressing end 142 and stacked on the printing stand 52 layer by layer so as to form the 3D object.

Meanwhile, in the embodiment, when the lead screw guide 140 in the above-mentioned state moves relative to the base 110 along the Z-axis and causes the pressing end 142 to move away from the base 110, the lead screw guide 140 actually moves relative to the base 110 by being guided via the second guiding member 130 and the first guiding member 120. The guiding end 144 of the lead screw guide 140 moves downward relative to the second guiding member 130 first along the Z-axis via the embedding relation between the second guiding posts 146 and the second guiding tracks 136. After the guiding end 144 of the lead screw guide 140 moves to the bottom of the second guiding member 130, the lead screw guide 140 drives the second guiding member 130 to move downward relative to the first guiding member 120 along the Z-axis via the embedding relation between the first guiding tracks 134 and the first guiding posts, so that the lead screw guide 140 continually moves downward relative to the base 110 along the Z-axis. In the process, the second guiding member 130 and the guiding end 144 continually move downward toward the first guiding member 120 along the Z-axis, and then hide in the first channel 122 of the first guiding member 120. However, in the other embodiments, the second guiding member 130 may move toward the first guiding member 120 by being driven via the lead screw guide 140 when the guiding end 144 of the lead screw guide 140 moves to the middle of the second guiding member 130, which should not be construed as a limitation to the invention.

As indicated above, when the 3D printing apparatus 50 is in the operating state, the 3D printing apparatus 50 uses the lead screw assembly guide 100 to drive the printing unit 54 to perform printing in the actuation manner described above, as shown by FIG. 4, and the second guiding member 130 and the guiding end 144 hide in the first channel 122 of the first guiding member 120. At this time, the guiding end 144 of the lead screw guide 140 and the top portion of the second guiding member 130 are located at a second level of height H2. In such manner, the overall height of the lead screw guide assembly 100 can be reduced. To be specific, when the 3D printing apparatus 50 is in the operating state, the space between the first level of height H1 and the second level of height H2 can be saved. In the meantime, the height of the housing 58 (shown by FIG. 1) is approximately equivalent to the second level of height H2. When the 3D printing apparatus 50 is in the initial state or during replacement of the barrel 54a, the guiding end 144 of the lead screw guide 140 and the second guiding member 130 may extend outwardly from the housing 58. That is, the overall height of the 3D printing apparatus 50 does not have to reach the first level of height H1. In such configuration, when the 3D printing apparatus 50 is in the transporting state, the lead screw guide 140 and the second guiding member 130 may hide in the first channel 122, such that the height of the lead screw guide assembly 100 and the 3D printing apparatus 50 can be reduced. Therefore, the lead screw guide assembly 100 and the 3D printing apparatus 50 in the embodiment utilize retractable first guiding member 120 and the second guiding member 130 to replace the conventional one-piece guiding member, so as to reduce the space required for the lead screw guide assembly 100 and the 3D printing apparatus 50 in the Z-axis.

Likewise, when the 3D printing apparatus 50 needs to replace the barrel 54a, the lead screw guide 140 of the lead screw guide assembly 100 may move upward relative to the base 110 along the Z-axis, so that the pressing end 142 of the lead screw guide 140 moves away from the printing unit 54 and returns to the bottom of the base 110. In that case, a suitable distance can be kept between the pressing end 142 and the moving rack 54b, such that the barrel 54a can be easily retrieved from the moving rack 54b and another barrel 54b can be easily disposed on the moving rack 54b. At this time, the guiding end 144 of the lead screw guide 140 moves upward along the Z-axis away from the top portion of the base 110. When the guiding end 144 moves to the top portion of the first guiding member 120, the second guiding member 130 may move upward relative to the first guiding member 120 along the Z-axis to extend out of the first channel 122 as shown by FIG. 4 to FIG. 3. Moreover, in the embodiment, the lead screw guide assembly 100 further includes a detecting unit 150 disposed at one side of the first guiding member 120 and adjacent to the second guiding member 130, so as to detect the position of the lead screw guide 140. However, the invention provides no limitation to the position of the detecting unit 150 and whether the detecting unit 150 is disposed or not, which may be adjusted depending on the needs.

As indicated above, in the lead screw guide assembly and 3D printing apparatus of the invention, the lead screw guide is movably disposed on the base and coupled to the second guiding member. The second guiding member is movably coupled to the first guiding member and adaptable for moving relative to the first guiding member. In such manner, when the 3D printing apparatus is in the operating state, the lead screw guide that is coupled to the second guiding member may move relative to the base and drive the second guiding member to move and hide in the first channel or protrude from the first channel. Accordingly, when the 3D printing apparatus is in the transporting state in which the lead screw guide assembly does not actuate, the overall height of the lead screw guide assembly can be reduced. Therefore, the housing adopted by the 3D printing apparatus does not need to have an additional operating space reserved for the lead screw guide assembly. In other words, the two retractable guiding members used by the lead screw guide assembly replace conventional one-piece guiding member, so as to reduce the space required for the lead screw guide assembly. In such configuration, the lead screw guide assembly and the 3D printing apparatus of the invention can reduce the space required for the 3D printing apparatus.

Finally, it should be indicated that the above-mentioned embodiments are provided only to exemplify the technical solution of the invention rather than to be restrictive to the invention. Although the invention has been disclosed by the above embodiments, the embodiments are not intended to limit the invention. It will be apparent to those skilled in the art that various modifications and variations can be made to the structure of the disclosed embodiments without departing from the scope or spirit of the invention. In view of the foregoing, it is intended that the invention cover modifications and variations of this invention provided they fall in the scope of the following claims and their equivalents.

What is claimed is:

1. A lead screw guide assembly adaptable for a three-dimensional (3D) printing apparatus, comprising:
   a base;
   a first guiding member disposed on the base and having a first channel extending along an axis;
   a second guiding member movably coupled to the first guiding member along the axis; and
   a lead screw guide, being a single-piece member, movably disposed on the base along the axis and located in the first channel, the lead screw guide coupled to the second guiding member, so as to drive the second guiding member to move along the axis, and the driving of the second guide member simultaneously causing movement of the second guide member such that the second guiding member moves along with the lead screw guide to hide in the first channel or protrude from the first channel simultaneously wherein the lead screw guide has a pressing end and a guiding end opposite to each other, the pressing end is located at one side of the base relative to the second guiding member, and the guiding end is coupled to the second guiding member, when the lead screw guide moves along the axis and causes the pressing end to move away from the base, the lead screw guide drives the second guiding member via the guiding end to move along the axis and hide in the first channel, when the lead screw guide moves along the axis and causes the pressing end to move closer to the base, the lead screw guide drives the second guiding member via the guiding end to move along the axis and protrude from the first channel.

2. The lead screw guide assembly as claimed in claim 1, wherein the second guiding member has a second channel extending along the axis and connected to the first channel, and the lead screw guide is located in the first channel and the second channel.

3. The lead screw guide assembly as claimed in claim 2, wherein the second guiding member further comprises a pair of first guiding tracks extending along the axis and located at two opposite sides of the second channel, and two opposite sides of the first guiding member have a pair of first guiding posts facing the second guiding member, the pair of first guiding posts is correspondingly embedded in the pair of first guiding tracks, so that the second guiding member is coupled to the first guiding member and moves relative to the first guiding member along the axis via the pair of first guiding tracks.

4. The lead screw guide assembly as claimed in claim 2, wherein the second guiding member further comprises a pair of second guiding tracks extending along the axis and located at two opposite sides of the second channel, and the lead screw guide has a pair of second guiding posts correspondingly embedded in the pair of second guiding tracks, so that the lead screw guide is coupled to the second guiding member and moves relative to the base along the axis via the pair of second guiding tracks.

5. The lead screw guide assembly as claimed in claim 2, wherein the second guiding member comprises two plates opposite to each other and spaced apart by a distance to construct the second channel.

6. The lead screw guide assembly as claimed in claim 1, wherein the first guiding member comprises two plates opposite to each other and spaced apart by a distance to construct the first channel.

7. The lead screw guide assembly as claimed in claim 1, wherein the base comprises a supporting plate and a linear motor, the linear motor is disposed on the supporting plate and connected to the lead screw guide, so as to drive the lead screw guide to move relative to the base.

8. The lead screw guide assembly as claimed in claim 1, wherein a barrel is disposed at one side of the lead screw guide, and the lead screw guide corresponds to the barrel via the pressing end.

9. The lead screw guide assembly as claimed in claim 1, further comprising:
   a detecting unit disposed at one side of the first guiding member and adjacent to the second guiding member, so as to detect a position of the lead screw guide.

10. A three-dimensional (3D) printing apparatus, comprising:
    a printing stand;
    a lead screw guide assembly movably disposed above the printing stand, comprising:
      a base;
      a first guiding member disposed on the base and having a first channel extending along an axis;
      a second guiding member movably coupled to the first guiding member along the axis; and
      a lead screw guide, being a single-piece member, movably disposed on the base along the axis and located in the first channel, the lead screw guide coupled to the second guiding member, so as to drive the second guiding member to move along the axis, and the driving of the second guide member simultaneously causing movement of the second guide member such that the second guiding member moves along with the lead screw guide to hide in the first channel or protrude from the first channel simultaneously; and
a printing unit connected to the lead screw guide assembly and corresponding to the lead screw guide.

11. The 3D printing apparatus as claimed in claim 10, wherein the second guiding member has a second channel extending along the axis and connected to the first channel, and the lead screw guide is located in the first channel and the second channel.

12. The 3D printing apparatus as claimed in claim 11, wherein the second guiding member further comprises a pair of first guiding tracks extending along the axis and located at two opposite sides of the second channel, and two opposite sides of the first guiding member have a pair of first guiding posts facing the second guiding member, the pair of first guiding posts is correspondingly embedded in the pair of first guiding tracks, so that the second guiding member is coupled to the first guiding member and moves relative to the first guiding member along the axis via the pair of first guiding tracks.

13. The 3D printing apparatus as claimed in claim 11, wherein the second guiding member further comprises a pair of second guiding tracks extending along the axis and located at two opposite sides of the second channel, and the lead screw guide has a pair of second guiding posts correspondingly embedded in the pair of second guiding tracks, so that the lead screw guide is coupled to the second guiding member and moves relative to the base along the axis via the pair of second guiding tracks.

14. The 3D printing apparatus as claimed in claim 11, wherein the second guiding member comprises two plates opposite to each other and spaced apart by a distance to construct the second channel.

15. The 3D printing apparatus as claimed in claim 10, wherein the first guiding member comprises two plates opposite to each other and spaced apart by a distance to construct the first channel.

16. The 3D printing apparatus as claimed in claim 10, wherein the base comprises a supporting plate and a linear motor, the linear motor is disposed on the supporting plate and connected to the lead screw guide, so as to drive the lead screw guide to move relative to the base.

17. The 3D printing apparatus as claimed in claim 10, wherein the lead screw guide has a pressing end and a guiding end opposite to each other, the pressing end is located at one side of the base relative to the second guiding member, and the guiding end is coupled to the second guiding member, when the lead screw guide moves along the axis and causes the pressing end to move away from the base, the lead screw guide drives the second guiding member via the guiding end to move along the axis and hide in the first channel, when the lead screw guide moves along the axis and causes the pressing end to move closer to the base, the lead screw guide drives the second guiding member via the guiding end to move along the axis and protrude from the first channel.

18. The 3D printing apparatus as claimed in claim 17, wherein a barrel is disposed at one side of the lead screw guide, and the lead screw guide corresponds to the barrel via the pressing end.

19. The 3D printing apparatus as claimed in claim 10, wherein the lead screw guide assembly further comprises:
a detecting unit disposed at one side of the first guiding member and adjacent to the second guiding member, so as to detect a position of the lead screw guide.

* * * * *